US011252228B2

(12) United States Patent
Rivera et al.

(10) Patent No.: US 11,252,228 B2
(45) Date of Patent: *Feb. 15, 2022

(54) MULTI-TENANT MULTI-SESSION CATALOGS WITH MACHINE-LEVEL ISOLATION

(71) Applicant: Citrix Systems, Inc., Fort Lauderdale, FL (US)

(72) Inventors: Juan Rivera, Doral, FL (US); Leo C. Singleton, IV, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/660,103

(22) Filed: Oct. 22, 2019

(65) Prior Publication Data
US 2020/0053147 A1 Feb. 13, 2020

Related U.S. Application Data

(63) Continuation of application No. 14/886,217, filed on Oct. 19, 2015, now Pat. No. 10,498,807.

(51) Int. Cl.
*H04L 29/08* (2006.01)
*G06F 9/50* (2006.01)

(52) U.S. Cl.
CPC ........ *H04L 67/1031* (2013.01); *G06F 9/5027* (2013.01); *G06F 9/5072* (2013.01); *H04L 67/1008* (2013.01); *G06F 2209/5011* (2013.01)

(58) Field of Classification Search
CPC .......... H04L 67/1031; H04L 41/0896
See application file for complete search history.

(56) References Cited

U.S. PATENT DOCUMENTS

| 2003/0224781 | A1* | 12/2003 | Milford | ..................... | H04L 1/16 |
| | | | | | 455/426.1 |
| 2006/0129687 | A1 | 6/2006 | Goldszmidt et al. | | |
| 2006/0218285 | A1 | 9/2006 | Talwar et al. | | |
| 2008/0301806 | A1* | 12/2008 | Gerard | ..................... | G06F 21/14 |
| | | | | | 726/22 |

(Continued)

FOREIGN PATENT DOCUMENTS

CN 103685536 A 3/2014
CN 104246743 A 12/2014

(Continued)

OTHER PUBLICATIONS

Dec. 5, 2019—(JP) Notice of Allowance—App 2018-520133.

(Continued)

*Primary Examiner* — Nicholas P Celani
(74) *Attorney, Agent, or Firm* — Banner & Witcoff, Ltd.

(57) ABSTRACT

Methods, systems, and computer-readable media for creating and managing cloud servers and services using a multi-tenant multi-session catalog with machine-level isolation are described herein. In one or more embodiments, a cloud service provider may receive requests from one or more tenants for predefined numbers of servers. The cloud service provider may initialize a plurality of servers, wherein the plurality of servers is less than a sum of the totality of server requests, and create a catalog of unassigned servers of the plurality of servers. Responsive to a logon request from a user of a tenant, the cloud service provider may assign a server from the catalog of unassigned servers to the tenant, remove the server from the catalog of unassigned servers, broker the user of the tenant to connect to the server, and limit access to the server to only users of the tenant.

20 Claims, 8 Drawing Sheets

(56) References Cited

U.S. PATENT DOCUMENTS

| | | | |
|---|---|---|---|
| 2010/0281151 A1* | 11/2010 | Ramankutty | H04L 67/288 |
| | | | 709/223 |
| 2010/0293269 A1 | 11/2010 | Wilson et al. | |
| 2011/0173637 A1 | 7/2011 | Brandwine et al. | |
| 2012/0072762 A1 | 3/2012 | Atchison et al. | |
| 2012/0284408 A1 | 11/2012 | Dutta et al. | |
| 2013/0030785 A1 | 1/2013 | Satterfield et al. | |
| 2013/0268940 A1 | 10/2013 | Gmach et al. | |
| 2014/0156706 A1 | 6/2014 | Beecham et al. | |
| 2014/0173594 A1 | 6/2014 | Ng et al. | |
| 2014/0222889 A1* | 8/2014 | Bello | H04L 47/76 |
| | | | 709/202 |
| 2015/0120928 A1 | 4/2015 | Gummaraju et al. | |
| 2015/0288727 A1 | 10/2015 | Govindankutty et al. | |

FOREIGN PATENT DOCUMENTS

| | | |
|---|---|---|
| CN | 104737517 A | 6/2015 |
| JP | 2005115653 A | 4/2005 |
| JP | 2013207784 A | 10/2013 |
| JP | 2015122088 A | 7/2015 |
| WO | 2014039918 A1 | 3/2014 |
| WO | 2015049789 A1 | 4/2015 |

OTHER PUBLICATIONS

Jan. 25, 2017—(WO) International Search Report and Written Opinion—App PCT/US2016/056943.
Aug. 24, 2017—U.S. Non-final Office Action—U.S. Appl. No. 14/886,217.
Jan. 11, 2018—U.S. Final Office Action—U.S. Appl. No. 14/886,217.
May 2, 2018—U.S. Non-final Office Action—U.S. Appl. No. 14/886,217.
Sep. 6, 2018—U.S. Final Office Action—U.S. Appl. No. 14/886,217.
Feb. 26, 2019—U.S. Non-final Office Action—U.S. Appl. No. 14/886,217.
Jul. 17, 2019—U.S. Notice of Allowance—U.S. Appl. No. 14/886,217.
Apr. 13, 2021—(EP) Office Action—App 16 790 478.8-1203.
May 26, 2021 (CN) First Office Action—App. 2016800606894.

* cited by examiner

MULTI-TENANT MULTI-SESSION CATALOGS WITH MACHINE-LEVEL ISOLATION

CROSS REFERENCE TO RELATED APPLICATIONS

This application claims priority to and is a Continuation of U.S. application Ser. No. 14/886,217, filed Oct. 19, 2015, hereby incorporated by reference in its entirety.

FIELD

Aspects described herein generally relate to computers, networking, hardware, and software. In particular, one or more aspects of the disclosure generally relate to computer hardware and software for cloud hosting and related services offering machine-level isolation.

BACKGROUND

Many enterprises (e.g., corporations, partnerships, governments, academic institutions, other organizations, etc.) are now using virtualization and clouds of computing resources to fulfill their information technology and computing needs. Cloud service providers (CSP) can deliver cloud-based computing services (e.g., Infrastructure-as-a-Service (IaaS), Platform-as-a-Service (PaaS), Software-as-a-Service (SaaS), and storage services) by providing the ability to create virtual servers on demand. Such virtual servers can have defined attributes such as an operating system, installed software applications and services, and the like. The virtualization technology used by the cloud service providers allows a single virtual server to deploy one or more remote desktop services (RDS) sessions to one or more users simultaneously. The multiple sessions in the virtual server may be kept separate, such that the activities of one user in one session may not affect the experiences of other users. In some instances, enterprises may prefer a higher level of isolation by requiring that each virtual server may only serve users from their particular enterprise.

Currently, cloud service providers, which host desktops and applications for their customers or tenants, can offer services with different levels of tenant isolation. Two common levels of tenant isolation are shared and private. In shared mode, multiple tenants may share a single catalog of virtual servers, and each virtual server may host users from multiple tenants. Shared mode offers only session-level isolation across tenants. This mode is typically the least expensive option because it offers the best user density across the virtual servers provisioned by the cloud service provider. In private mode, each tenant is assigned a separate catalog of virtual servers, and each virtual server may only host users from the particular tenant. Private mode offers better security and machine-level isolation across tenants but a higher cost as it requires the cloud service provider to provision a larger amount of virtual servers to serve the same number of tenants.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for creating and managing a multi-tenant multi-session catalog with machine-level isolation. In particular, aspects of the disclosure provide efficient, cost-effective, and convenient ways for a cloud service provider to deliver software applications and services to a plurality of users corresponding to a plurality of tenants while maintaining machine-level isolation across tenants. Aspects of the disclosure described in greater detail below may be used by cloud service providers to create a virtual server catalog that may combine the advantages of the shared and private isolation modes described above. Specifically, aspects of the disclosure relate to a multi-tenant multi-session catalog that may combine the machine-level isolation of private mode with the cost savings achieved by the higher user density of shared mode.

The method may comprise receiving, by a cloud service provider, requests from one or more tenant organizations for predefined numbers of servers. The tenant organizations may subscribe with the cloud service provider to receive one or more software applications and services hosted on the requested servers. The cloud service provider may initialize a plurality of servers, wherein the plurality of servers is less than a sum of the totality of server requests from the one or more tenant organizations. The cloud service provider may create a catalog of unassigned servers of the plurality of initialized servers.

In one or more embodiments discussed in greater detail below, the cloud service provider may receive a logon request from a first user of a first tenant to access a server. In response to the logon request, the cloud service provider may assign a first server from the catalog of unassigned servers to the first tenant, remove the first server from the catalog of unassigned servers, broker the first user of the first tenant to connect to the first server, and limit access to the first server to only users of the first tenant. Additionally, the cloud service provider may receive a logon request from a first user of a second tenant to access a server. In response to the logon request, the cloud service provider may assign a second server from the catalog of unassigned servers to the second tenant, remove the second server from the catalog of unassigned servers, broker the first user of the second tenant to connect to the first server, and limit access to the second server to only users of the second tenant.

In some embodiments, the cloud service provider may initialize the plurality of servers with a common image. The common image may include operating systems, application programs, and other software that is delivered to the tenants subscribed to the cloud service provider. In other embodiments, the plurality of servers may be configured to provide remote desktop services (RDS) to one or more users simultaneously. In one or more arrangements, the plurality of servers may be hosted in a cloud service. In other arrangements, the cloud service provider may randomly select a particular server from the catalog of unassigned servers to assign to the first tenant.

The method may further comprise receiving, by the cloud service provider, a logon request from a second user of the first tenant to access a server. In response to the logon request, the cloud service provider may determine a free capacity of the first server and whether the free capacity of the first server is less than a predetermined threshold capacity. Upon determining that the free capacity of the first server is less than the predetermined threshold capacity, the cloud service provider may assign a third server from the catalog of unassigned servers to the first tenant, remove the third server from the catalog of unassigned servers, broker the third user of the first tenant to connect to the third server; and limit access to the third server to only users of the first tenant.

In some embodiments, the method may further comprise receiving, by the cloud service provider, a logon request from a second user of a first tenant to access a server. In response to the logon request, the cloud service provider may determine one or more servers assigned to the first tenant, and a free capacity for each of the one or more servers assigned to the first tenant. The cloud service provide may, based on the free capacity determination, further determine one assigned server of the one or more servers assigned to the first tenant with a largest free capacity. The cloud service provider may broker the second user of the first tenant to the determined assigned server of the one or more servers assigned to the first tenant with the largest free capacity.

In other embodiments, the method may further comprise receiving a logoff request from a user logged in to a particular server. The cloud service provider may, in response to receiving the logoff request from the user, log the user out of the particular server. In further response to the logoff request from the user, the cloud service provider may determine whether there are no users logged into the particular server. Based on the determination that there are no users logged into the particular server, the cloud service provider may reimage the particular server, remove the assignment from the particular server, and return the particular server to the catalog of unassigned servers. For example, once the particular server has been reimaged and unassigned, the particular host server may be assigned to any tenant and any user may be connected to it in response to a subsequent logon request.

Alternatively, in yet other embodiments, the method may further comprise maintaining a single idle pool of unassigned servers for both the first tenant and the second tenant. For example, the unassigned host servers in the idle pool may be assigned, as needed, in response to subsequent logon requests.

Systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for creating and managing a multi-tenant multi-session catalog with machine-level isolation. In particular, aspects described herein may be used to assign host servers from the multi-tenant multi-session catalog to tenants and connect users from the corresponding tenants to the assigned host servers in response to logon requests from the users. Other aspects described herein may be used to unassign and reimage assigned host servers in response to logoff requests from the connected users.

Before discussing these concepts in greater detail, several examples of computing architecture and systems that may be used in implementing and/or otherwise providing various aspects of the disclosure will first be discussed with respect to FIGS. 1-4.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
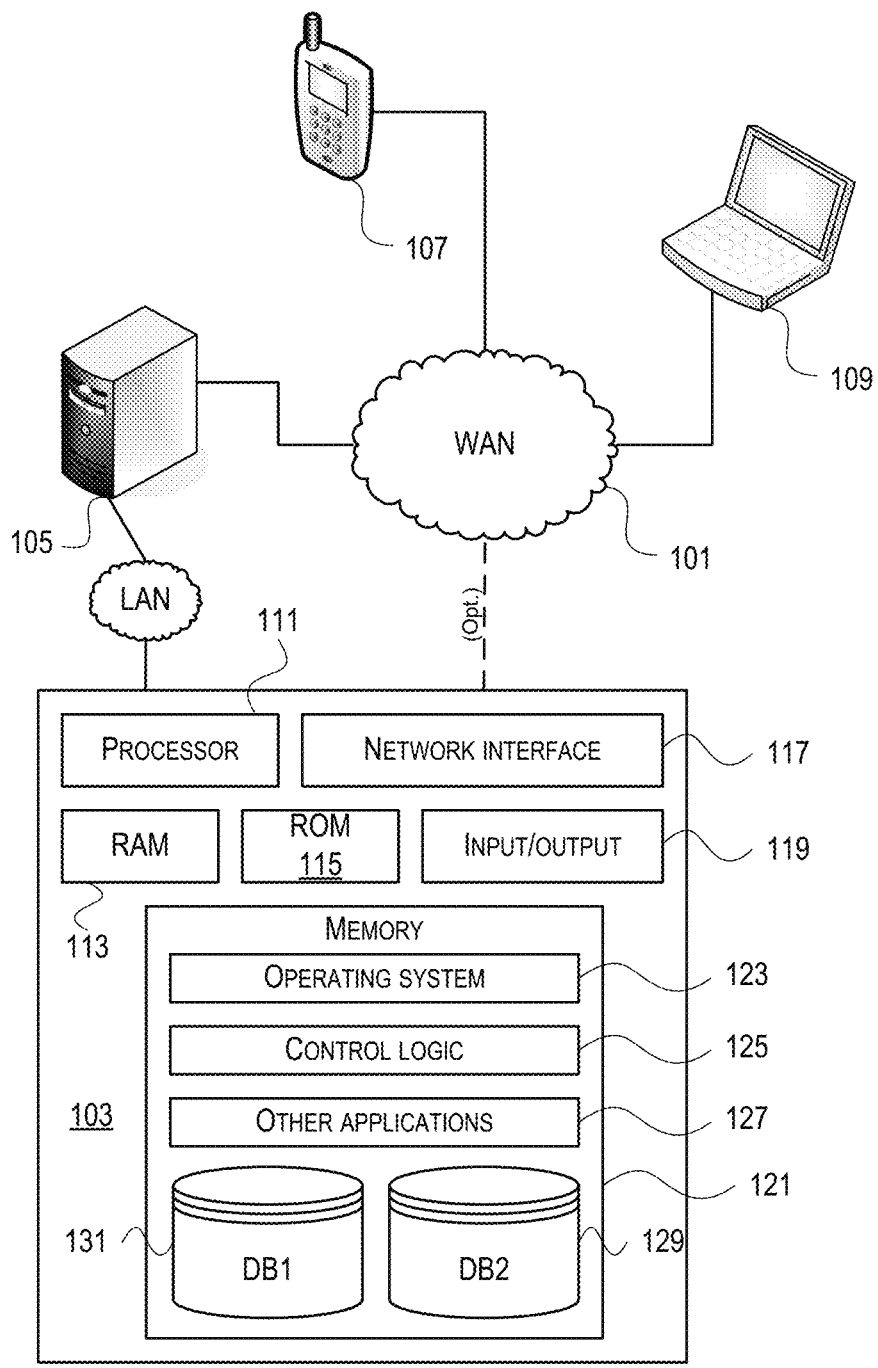
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
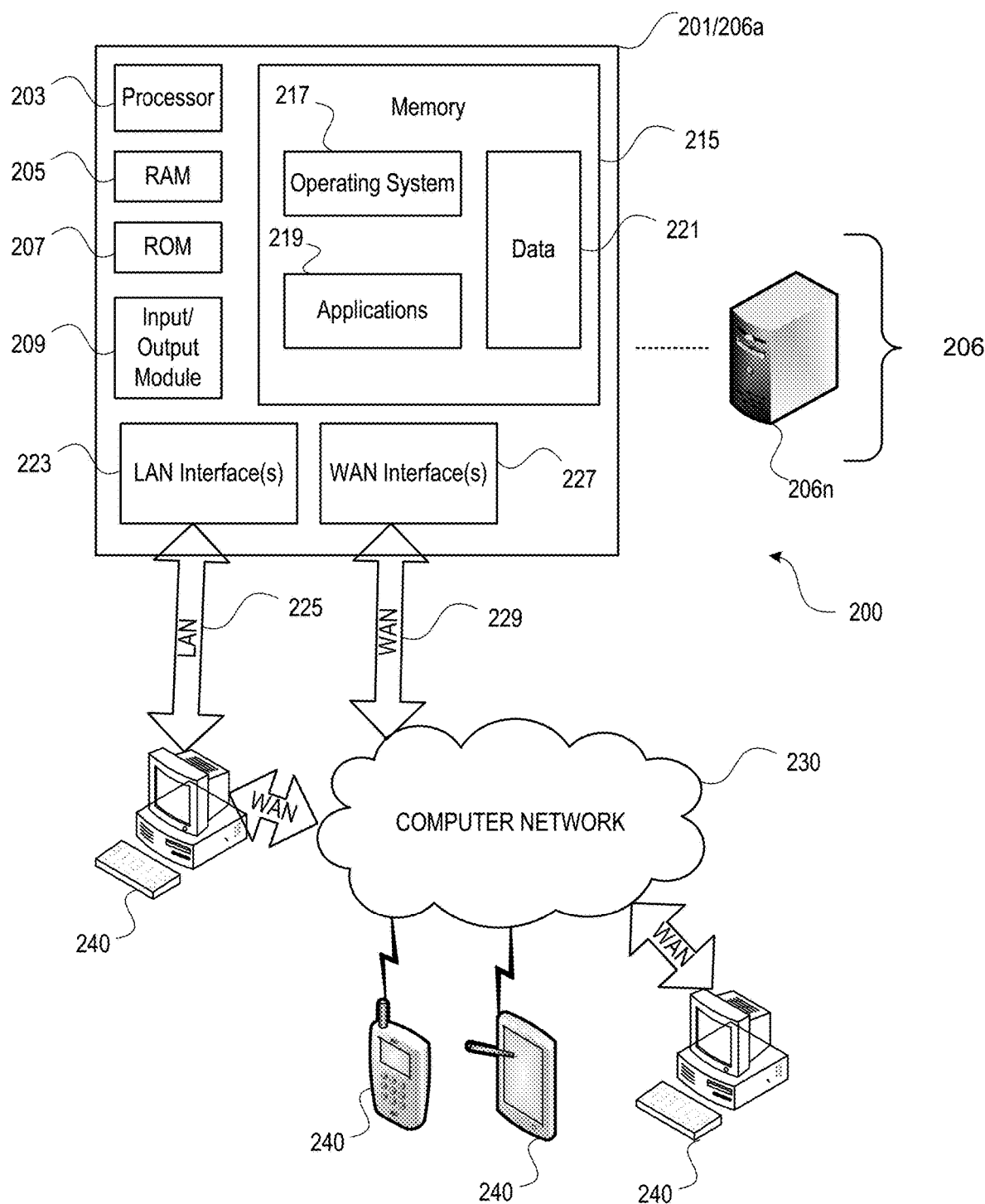
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
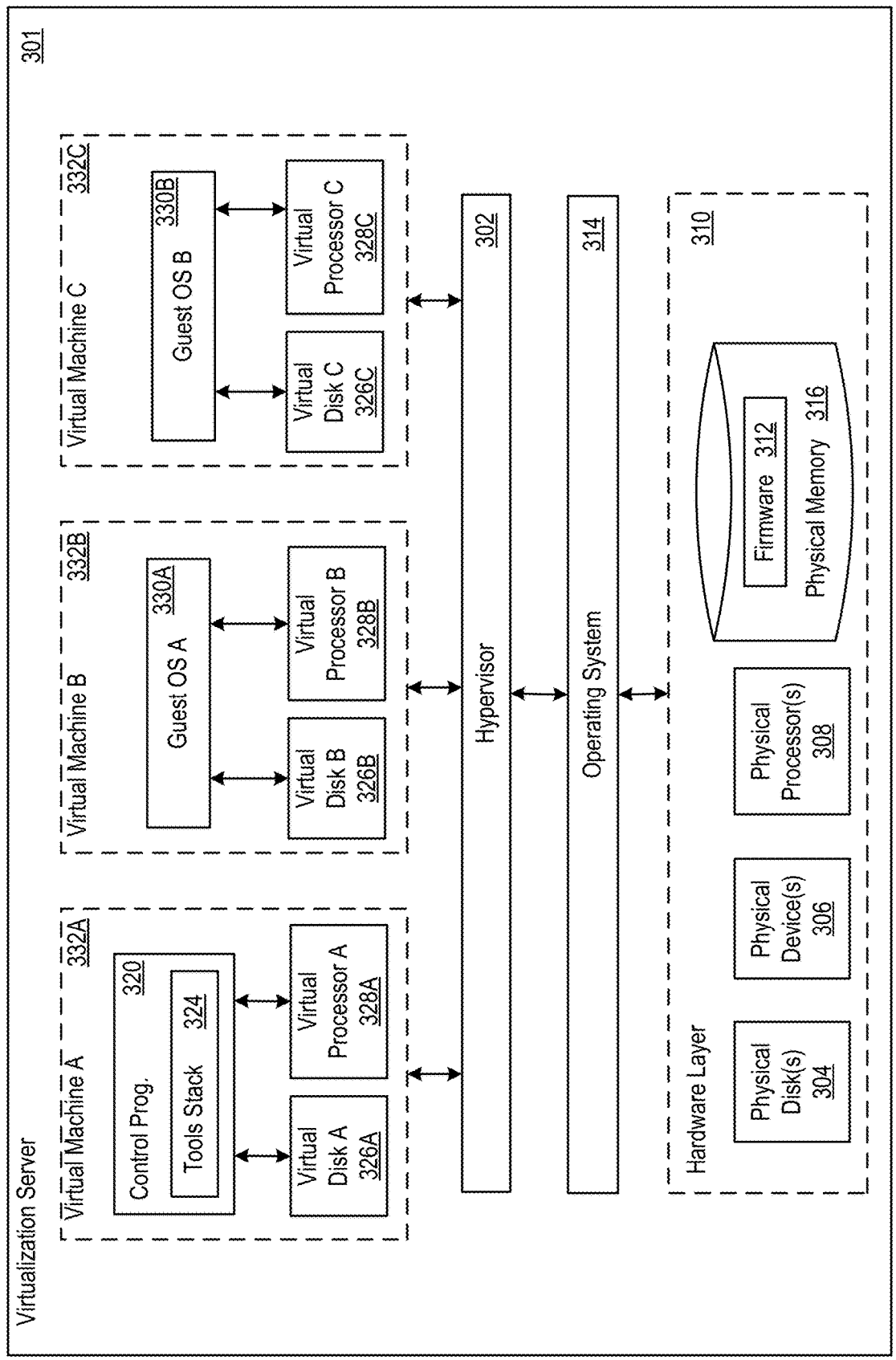
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
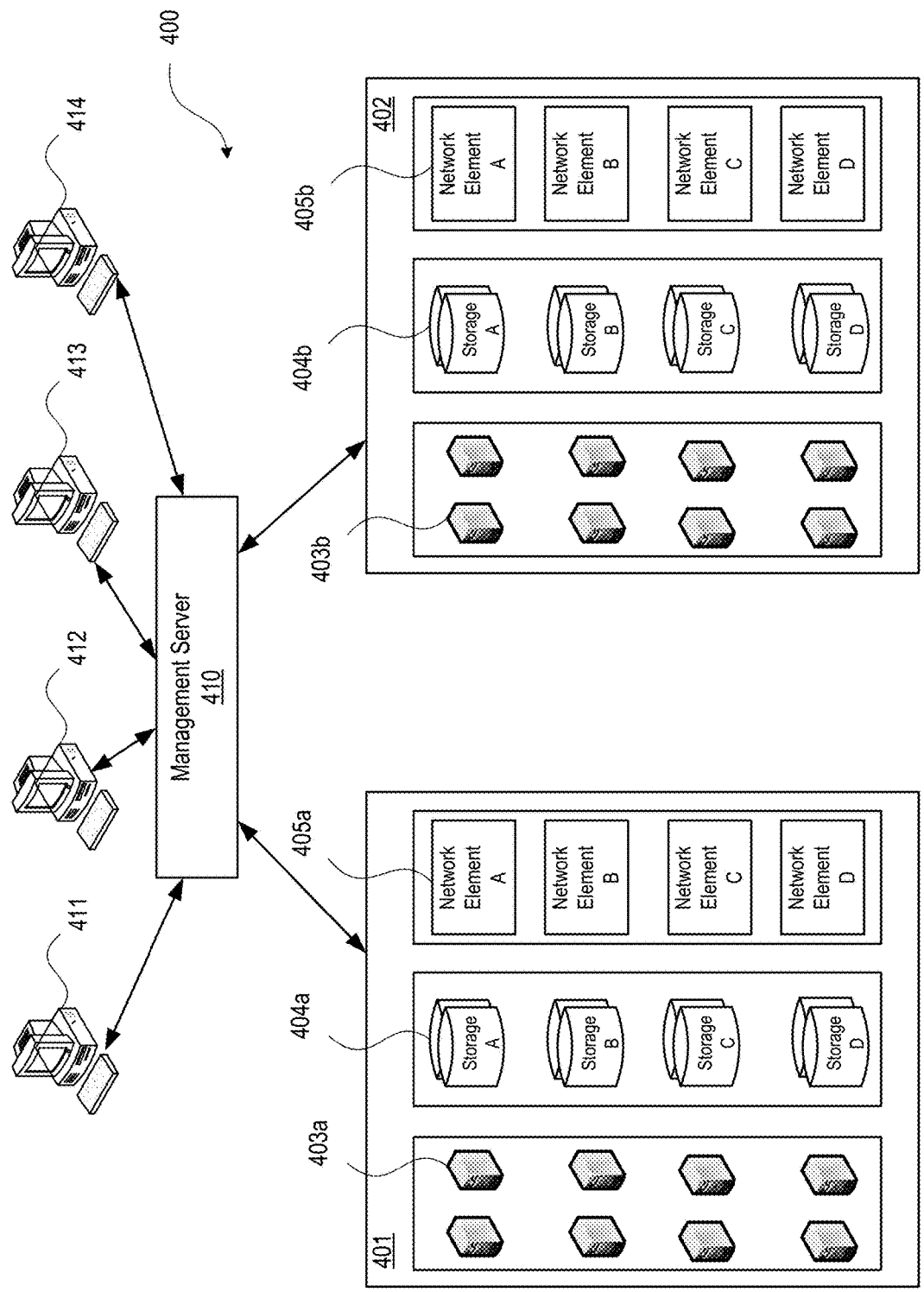
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Illustrative Embodiments

Having discussed several examples of the computing architecture that may be used in providing and/or implementing various aspects of the disclosure, a number of embodiments will now be discussed in greater detail. In particular, and as introduced above, some aspects of the disclosure generally relate to creating and managing a multi-tenant multi-session catalog with machine-level isolation. In the description below, various examples illustrating how such a catalog with machine-level isolation may be created and maintained in accordance with one or more embodiments will be discussed.

Figure 5:
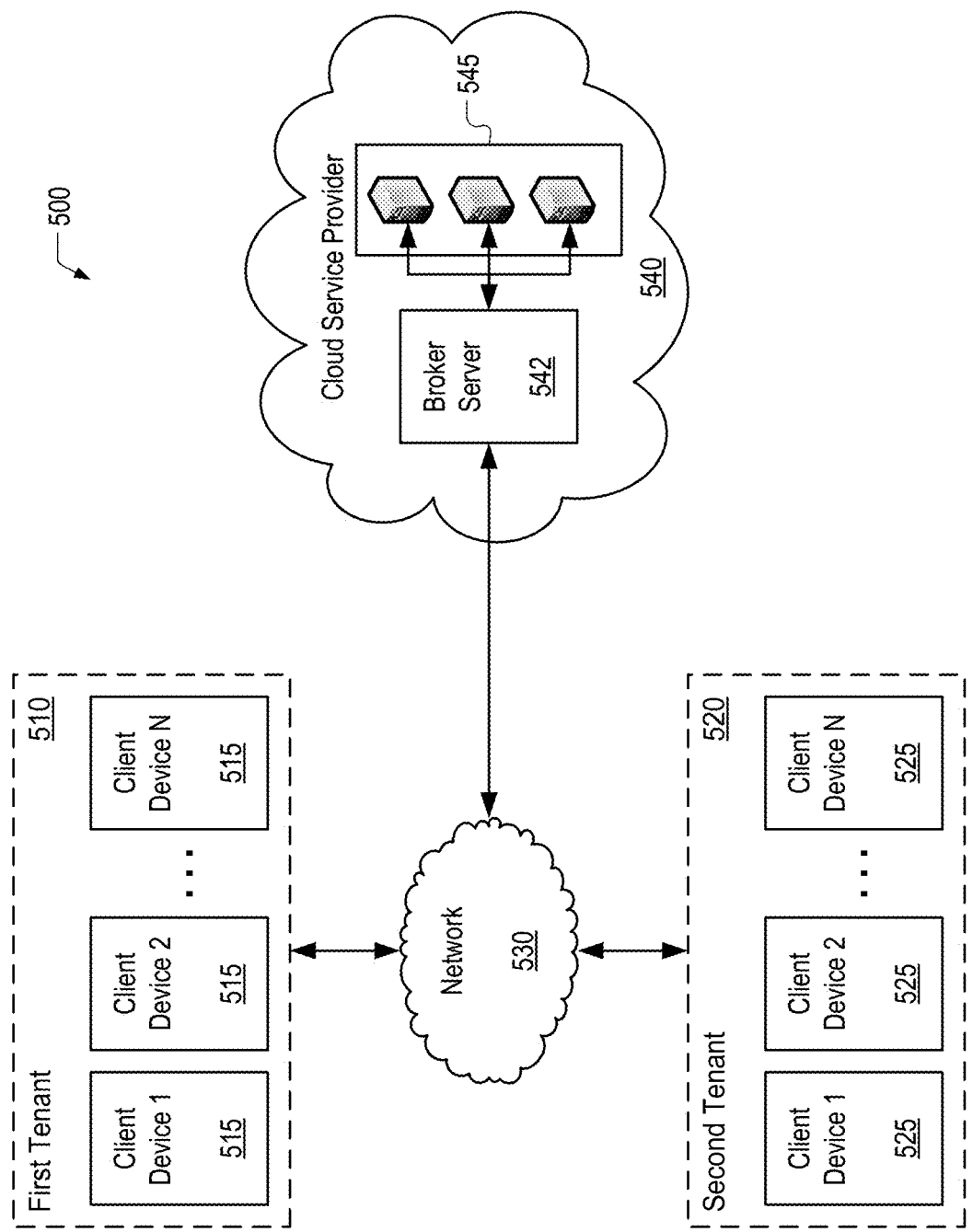
FIG. 5 depicts an illustrative system architecture which may be used for creating and managing a multi-tenant multi-session catalog with machine-level isolation, according to one or more illustrative aspects described herein.

FIG. 5 depicts an illustrative system architecture which may be used for creating and managing a multi-tenant multi-session catalog with machine-level isolation. As seen in FIG. 5, client devices 515 and 525 may communicate with a broker server 542 to access the host servers 545 of the cloud service provider 540. The architecture of the system depicted in FIG. 5 is similar in many respects to the architecture of the cloud computing environment 400 described above with reference to FIG. 4 and may include additional features not mentioned above. Some of the components of the cloud computing environment 400 described above with reference to FIG. 4 have been omitted for the sake of simplicity.

The computing environment 500 may include one or more tenants. For example, computing environment 500 may include one or more tenants, such as first tenant 510 (which may, e.g., be a first enterprise and which may be subscribed to the software services provided by cloud service provider 540), and second tenant 520 (which may, e.g., be a second enterprise different from the first enterprise and which may be subscribed to the same software services provided by cloud service provider 540 as first tenant 510.) First tenant 510 may include one or more enterprise users that may be allowed to connect to the cloud service provider 540 via one or more client devices 515. Similarly, second tenant 520 may include one or more enterprise users that may be allowed to connect to the cloud service provider 540 via one or more client devices 525. Client devices 515 and 525 may be any type of computing device capable of receiving and processing input via one or more user interfaces, providing output via one or more user interfaces and communicating input, output, and/or other information to and/or from one or more other computing devices. For example, client devices 515 and 525 may be a server computer, a desktop computer, a laptop computer, a tablet computer, a smart phone, or the like. In addition, the client devices 515 and 525 may be one of the computing devices described above in reference to FIGS. 1, 2, and 4 (e.g., devices 103, 105, 107, 109, 240, and 411-414.)

Computing environment 500 also may include one or more networks, which may interconnect one or more of client devices 515, one or more of client devices 525, broker server 542, and one or more of host servers 545. For example, computing environment 500 may include network 530, which may include one or more private networks (which may, e.g., be operated by and/or associated with an organization that operates cloud service provider 540 and which may include one or more local area networks, wide area networks, virtual private networks, etc.) and/or one or more public networks (e.g., the Internet).

Referring to FIG. 5, computing environment 500 may include a cloud service provider 540. The cloud service provider 540 may offer tenants, or subscribers, one or more software services. The cloud service provider 540 may install, operate, maintain, and update one or more software applications and services on a catalog comprising one or more host servers 545 and deliver those software applications and services to the users of one or more tenants. Each of the host servers 545 in the catalog may be a single-server or multi-server system, or a cloud-based system, including at least one virtualization server, as described above with reference to FIG. 4. The host servers 545 may be configured as multi-session servers capable of deploying one or more remote desktop services (RDS) to one or more users simultaneously. The multi-session host servers 545 may allow the multiple instances or sessions to be kept separate, such that the activities of one user may not affect the experiences of other users. For example, in one embodiment, XENAPP manufactured by Citrix Systems, Inc. of Fort Lauderdale, Fla., may be adapted to provide one or more functions described herein. Further security may be achieved, as described in further detail below, by segregating users to host servers 545 based on the tenant organization to which the users belong. For example, once a host server 545 has been assigned to first tenant 510, only users from first tenant 510 may be connected to that host server 545. No users from any other tenant, e.g. second tenant 520, may be connected to a host server 545 assigned to first tenant 510. In some embodiments, further isolation may be achieved by assigning physical machines to a particular tenant and connecting only users from that particular tenant to the host servers 545 hosted by the particular physical machine. For example, once a physical machine has been assigned to first tenant 510, only users from first tenant 510 may be connected to any of the host servers 545 hosted by the physical machine. No users from any other tenant, e.g. second tenant 520, may be connected to a host server 545 hosted by the physical machine assigned to first tenant 510.

The one or more tenants (e.g., 510 and 520) of the cloud service provider 540 may request that a predetermined number of host servers 545 be made available to the users from the tenant's organization. In response to the requests, the cloud service provider 540 may be configured to create a catalog which includes a number of host servers 545 which is less than the sum of the totality of tenant host server requests. That is, the cloud service provider 540 may only provision a number of host servers 545 sufficient to cover the peak demand of the totality of subscribed tenants, rather than provisioning an amount of host servers 545 that is equal to the total number of requested servers. For example, first tenant 510 and second tenant 520 may be located in two different time zones such that the server capacity needs of the two tenants alternate during a single twenty-four hour cycle. In another example, first tenant 510 and second tenant 520 may have both requested 1,000 servers (for a total of 2,000 servers) from the cloud service provider 540. However, at peak demand, first tenant 510 and second tenant 520 might only require a total of 1,500 servers. Thus, cloud service provider 540 may provision 1,500 host servers 545, rather than 2,000 servers, to deliver the subscribed software services to first tenant 510 and second tenant 520.

The cloud service provider 540 may include a broker server 542. The broker server 542 may be a single-server or multi-server system, or a cloud-based system, including at least one virtualization server, as described above with reference to FIG. 4. The broker server may include one or more processors, memory, and one or more communication interfaces (not shown.) The broker server 542 memory may store and/or otherwise include one or more program modules that include instructions that, when executed by the one or more processors, cause the cloud service provider 540 to perform one or more functions described herein. In addition, broker server 542 communication interfaces may be one or more network interfaces configured to support communication between cloud service provider 540 and network 530 and between broker server 542 and one or more host servers 545.

Broker server 542 may be configured to create and manage one or more host servers 545 and perform other cloud administration tasks. For example, broker server 542 may initialize one or more host servers 545 using a common image. The common image may include operating systems, application programs, and other software that is delivered to the tenants subscribed to the cloud service provider 540. In such an embodiment, cloud service provider 540 may deliver a similar computing environment comprising the same operating system and set of installed applications and software services to the users of first tenant 510 and second tenant 520.

Broker server 542 may be further configured to broker connections between client devices (e.g., 515 and 525) and the host servers 545. Client devices 515 and 525 may connect to broker server 542 via network 530 and may request access to one or more of the host servers 545. In response to client requests, the broker server 542 may assign one or more host servers 545 to one or more tenants and connect the client devices 515 and 525 to the assigned host servers 545 based on the tenant corresponding to the user. In other words, the broker server 542 may, in response to a logon request from one or more client devices 515 corresponding to first tenant 510, assign one or more host servers 545 to first tenant 510 and connect the one or more client devices 515 to the assigned host servers 545. The broker server 542 may use one or more criteria to determine which unassigned host servers 545 to assign to first tenant. For example, the broker server 542 may randomly select one or more host servers 545 from the catalog of unassigned host servers 545. Furthermore, once assigned to first tenant 510, the broker server 542 may block access to the assigned host servers 545 by client devices 525 corresponding to second tenant 520. The broker server 542 may be configured to determine whether there are one or more host servers 545 assigned the first tenant 510 in response to a logon request from a client device 515 corresponding to first tenant 510. If or when there are one or more host servers 545 assigned the first tenant 510, the broker server 542 may determine whether any of the assigned host servers 545 have sufficient free capacity to accept an additional user. If or when there are no assigned host servers 545 with sufficient free capacity, the broker server 542 may assign an additional host server 545 to first tenant 510 and connect the client device 515 to the additional host server 545. However, if or when there is at least one assigned host server 545 with sufficient free capacity, the broker server 542 may connect the client device 515 to one of the assigned host servers 545 with sufficient free capacity. The broker server 542 may use one or more criteria to determine which one of the assigned host servers 545 to connect to the client device 515. In one of several possible embodiments, the broker server 542 may connect the client device 515 to the assigned host server 545 with the largest amount of free capacity. In another embodiment, the broker server 542 may use load balancing techniques to determine the assigned host server 545 to connect with the client device 515.

In addition to logon requests, the broker server 542 may receive logoff requests from users connected to one or more host servers 545. In response to a logoff request, the broker server 542 may log the user out of the particular host server 545. The broker server 542 may also be configured to determine whether there are no users logged into the particular host server 545. If or when the particular host server 545 no longer has any users logged in, the broker server 542 may reimage the particular host server 545. For example, the broker server 542 may reimage the particular host server 545 using server provisioning technologies like Citrix Provisioning Services (PVS) and Machine Creation Services (MCS) both manufactured by Citrix Systems, Inc. of Ft. Lauderdale, Fla. In addition, the broker server 542 may remove the tenant assignment from the particular host server 545, and return the particular host server 545 to the catalog of unassigned host servers 545. Once the particular host server 545 has been reimaged and unassigned, the particular host server 545 may be assigned to any tenant and any user may be connected to it in response to a subsequent logon request.

In further reference to FIG. 5, the broker server 542 may be extended to maintain a single idle pool of unassigned host servers 545 that may be shared between the tenants subscribed to the cloud service provider 540. For example, broker server 542 may power down all unassigned host servers 545 in the catalog except for a predetermined amount that are to be kept in an idle pool. The unassigned host servers 545 in the idle pool may be made available, as needed, in response to subsequent logon requests from client devices (e.g., 515 and 525.)

Advantageously, and as illustrated in greater detail above, the multi-session (RDS) host servers 545 may deploy one or more remote desktop services (RDS) to one or more user devices (e.g., 515 and 525) simultaneously thus offering a lower cost per user than single-session (VDI) servers. In addition, the multi-tenant multi-session catalog provides machine-level isolation unlike typical RDS server deployments. Furthermore, the cloud service provider 540 may, via the use of the multi-tenant multi-session catalog described herein, achieve a cost savings over typical deployment methods by requiring less host servers 545 than those requested by the totality of subscribed tenants. Further savings may be achieved by extending the catalog to include the use of a single idle pool as described above.

FIG. 5 illustrates just one example of a system architecture that may be used, and those of skill in the art will appreciate that the specific system architecture and computing devices used may vary, and are secondary to the functionality that they provide, as further described herein. For example, the services provided by the broker server 542 may be executed on a single computing device or on multiple computing devices at one site or distributed across multiple sites and interconnected by a communication network.

Figure 6:
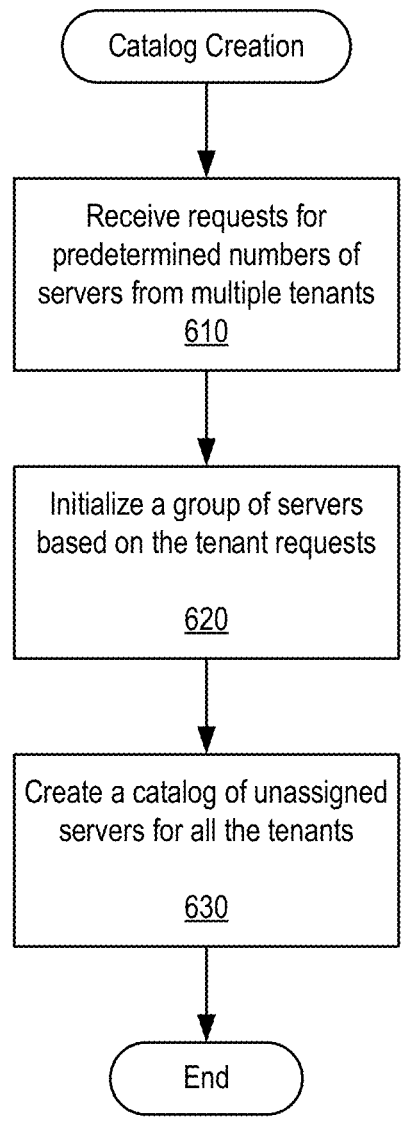
FIG. 6 depicts a flowchart that illustrates a method of creating a multi-tenant multi-session catalog with machine-level isolation in accordance with one or more example embodiments.

FIG. 6 depicts a flowchart that illustrates a method of creating a multi-tenant multi-session catalog with machine-level isolation in accordance with one or more example embodiments. The algorithm shown in FIG. 6 and other similar examples described herein may be performed in a computing environment such as the system illustrated in FIG. 5, as well as other systems having different architectures (e.g., all or part of FIGS. 1-4). In other embodiments, the method illustrated in FIG. 6 and/or one or more steps thereof may be embodied in a computer-readable medium, such as a non-transitory computer readable memory.

In step 610, the one or more tenants (e.g., 510 and 520) of the cloud service provider 540 may request that a predetermined number of host servers 545 be made available to the users from the tenant's organization.

In step 620, the cloud service provider 540 may initialize a number of host servers 545 which is less than the sum of the totality of tenant host server requests. That is, the cloud service provider 540 may only provision a number of host servers 545 sufficient to cover the peak demand of the totality of subscribed tenants, rather than provisioning an amount of host servers 545 that is equal to the total number of requested servers. The cloud service provider 540, in step 620, may initialize one or more host servers 545 using a common image. The common image may include operating systems, application programs, and other software that is delivered to the tenants subscribed to the cloud service provider 540. The host servers 545 may be configured as multi-session servers capable of deploying one or more remote desktop services (RDS) to one or more users simultaneously. The multi-session host servers 545 may allow the multiple instances or sessions to be kept separate, such that the activities of one user may not affect the experiences of other users.

In step 630, the cloud service provider 540 may create a single catalog of unassigned host servers 545 from the group of initialized host servers 545 provisioned in step 620. The cloud service provider 540 may use the catalog of unassigned host servers 545 to deliver subscribed software services to tenants as described herein.

Figure 7:
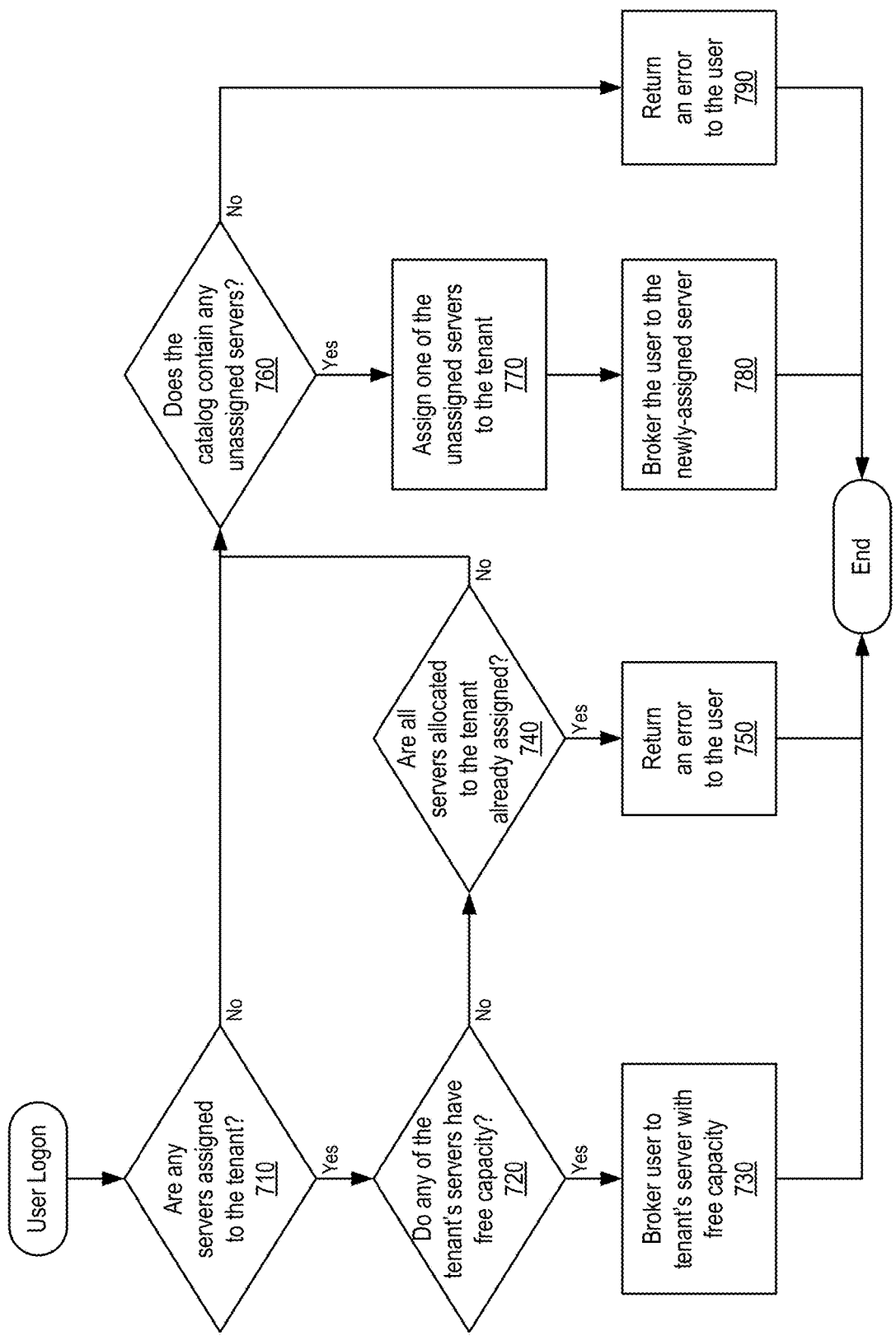
FIG. 7 depicts a flowchart that illustrates a method of responding to a user logon request by a multi-tenant multi-session catalog with machine-level isolation in accordance with one or more example embodiments.

FIG. 7 depicts a flowchart that illustrates a method of responding to a user logon request by a multi-tenant multi-session catalog with machine-level isolation in accordance with one or more example embodiments. The algorithm shown in FIG. 7 and other similar examples described herein may be performed in a computing environment such as the system illustrated in FIG. 5, as well as other systems having different architectures (e.g., all or part of FIGS. 1-4). In other embodiments, the method illustrated in FIG. 7 and/or one or more steps thereof may be embodied in a computer-readable medium, such as a non-transitory computer readable memory.

In response to a user logon request from a subscribed tenant, the cloud service provider 540 may determine whether the subscribed tenant corresponding to the user has one or more host servers 545 assigned, in step 710.

In step 710, in response to a user logon request from a subscribed tenant, the cloud service provider 540 may determine whether there are one or more host servers 545 assigned to the particular tenant. If or when there are no host servers 545 assigned to the particular tenant, the cloud service provider 540 may proceed to step 760. However, if or when there are one or more host servers 545 assigned to the particular tenant, the cloud service provider 540 may determine whether one or more of the assigned host servers 545 have sufficient free capacity to accept an additional user, as shown in step 720. If or when there is at least one assigned host server 545 with sufficient free capacity, in step 730, the cloud service provider 540 may broker the user to one of the assigned host servers 545 with sufficient free capacity and the method ends. The cloud service provider 540 may use one or more criteria to determine which one of the assigned host servers 545 with sufficient free capacity with which to broker a connection to the user. In one of several possible embodiments, the cloud service provider 540 may connect the user to the assigned host server 545 with the largest amount of free capacity. In another embodiment, the cloud service provider 540 may use load balancing techniques to determine the assigned host server 545 with which to broker a connection with the user.

In step 740, if or when there are no assigned host servers 545 with sufficient free capacity, the cloud service provider 540 may determine whether the number of host servers 545 assigned to the particular tenant is greater than or equal to the number of servers requested by the particular tenant. If or when the particular tenant has reached its maximum server allocation, in step 750, the cloud service provider 540 may respond to the user logon request with an error message and the method ends.

In step 760, the cloud service provider 540 may determine whether the catalog contains any unassigned host servers 545. If or when the catalog does not contain any unassigned host servers 545, in step 790, the cloud service provider 540 may respond to the user logon request with an error message and the method ends. However, if the catalog contains at least one unassigned host server 545, in step 770, the cloud service provider 540 may assign an unassigned host server 545 to the particular tenant. The cloud service provider 540 may use one or more criteria to determine a particular unassigned host server 545 to assign to the particular tenant. For example, the cloud service provider 540 may randomly select one unassigned host server 545 from the catalog of unassigned host servers 545. In step 780, the cloud service provider may broker a connection between the user and the newly-assigned host server 545.

Figure 8:
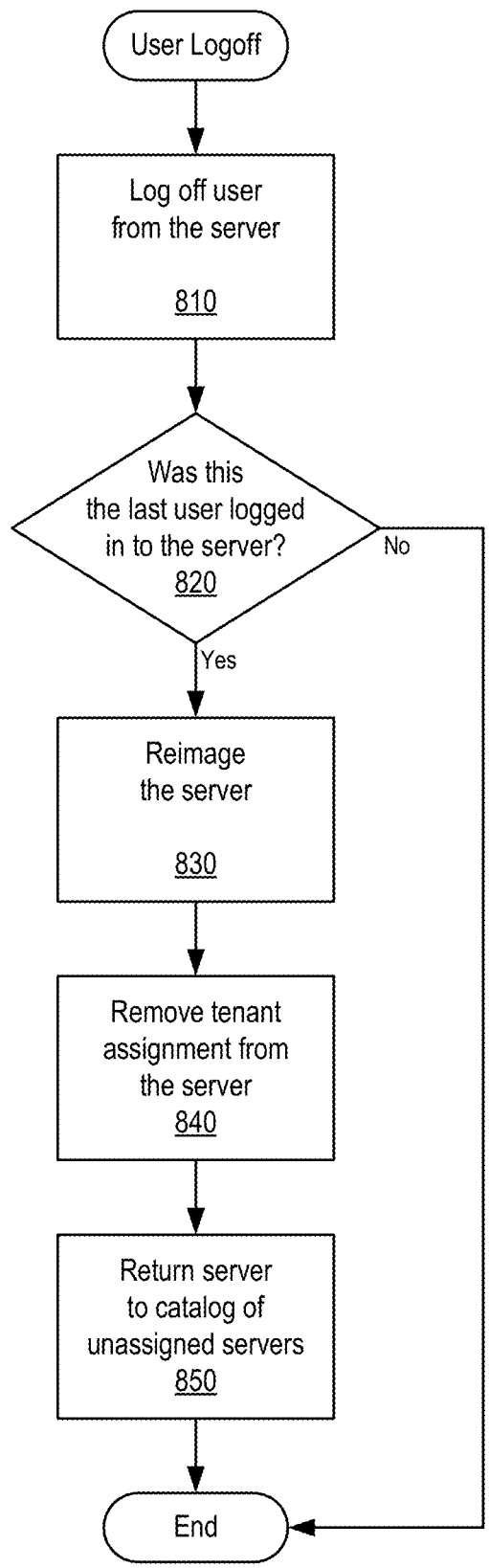
FIG. 8 depicts a flowchart that illustrates a method of responding to a user logoff request by a multi-tenant multi-session catalog with machine-level isolation in accordance with one or more example embodiments.

FIG. 8 depicts a flowchart that illustrates a method of responding to a user logoff request by a multi-tenant multi-session catalog with machine-level isolation in accordance with one or more example embodiments. The algorithm shown in FIG. 8 and other similar examples described herein may be performed in a computing environment such as the system illustrated in FIG. 5, as well as other systems having different architectures (e.g., all or part of FIGS. 1-4). In other embodiments, the method illustrated in FIG. 8 and/or one or more steps thereof may be embodied in a computer-readable medium, such as a non-transitory computer readable memory.

In step 810, in response to a user logoff request, the cloud service provider 540 may log the user out of the particular host server 545. In step 820, the cloud service provider 540 may determine whether there are no users logged into the particular host server 545. If or when the particular host server 545 no longer has any users logged in, the cloud service provider 540 may reimage the particular host server 545, as shown in step 830. For example, the cloud service provider 540 may reimage the particular host server 545 using server provisioning technologies like Citrix Provisioning Services (PVS) and Machine Creation Services (MCS) both manufactured by Citrix Systems, Inc. of Ft. Lauderdale, Fla. In step 840, the cloud service provider 540 may remove the tenant assignment from the particular host server 545. In step 850, the cloud service provider 540 may return the particular host server 545 to the catalog of unassigned host servers 545. Once the particular host server 545 has been reimaged and unassigned, the particular host server 545 may be assigned to any tenant and any user may be connected to it in response to a subsequent logon request.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
    creating, by a broker server associated with a cloud service provider, a catalog of unassigned servers identifying a plurality of unassigned multi-session host servers assignable by the broker server to at least a first tenant and a second tenant different from the first tenant, wherein a number of the plurality of unassigned multi-session host servers is less than a sum of a number of a first plurality of requested multi-session host servers received from the first tenant and a number of a second plurality of requested multi-session host servers received from the second tenant, and wherein the plurality of unassigned multi-session host servers are initialized by the broker server associated with the cloud service provider using a common image comprising a plurality of services subscribed to by the first tenant and the second tenant;
    based on receiving, by the broker server associated with the cloud service provider, a logon request from a first user device associated with the first tenant:
        assigning, by the broker server associated with the cloud service provider, a first server with the common image comprising the plurality of services from the catalog of unassigned servers to the first tenant, wherein assigning the first server to the first tenant causes access to the first server to be limited to user devices associated with the first tenant, and wherein assigning the first server to the first tenant comprises randomly selecting the first server from the catalog of unassigned servers;

removing, by the broker server associated with the cloud service provider, the first server from the catalog of unassigned servers; and brokering, by the broker server associated with the cloud service provider, a first connection between the first user device associated with the first tenant and the first server; and based on receiving, by the broker server associated with the cloud service provider, a logon request from a second user device associated with the second tenant, wherein the first tenant and the second tenant are located in two different time zones, and a server capacity need of the first tenant and a server capacity need of the second tenant alternate during a single twenty-four-hour cycle:

assigning, by the broker server associated with the cloud service provider, and based at least in part on the first tenant and the second tenant being located in two different time zones and the server capacity need of the first tenant and a server capacity need of the second tenant alternating during a single twenty-four hour cycle, a second server with the common image comprising the plurality of services from the catalog of unassigned servers to the second tenant, wherein assigning the second server to the second tenant causes access to the second server to be limited to user devices associated with the second tenant, and wherein assigning the second server to the second tenant comprises assigning the second server to the second tenant based on a number of provisioned servers being sufficient to cover peak demand of a totality of subscribed tenants independent from a total number of requested servers;

removing, by the broker server associated with the cloud service provider, the identification of the second server from the catalog of unassigned servers; and brokering, by the broker server associated with the cloud service provider, a second connection between the second user device associated with the second tenant and the second server.

2. The method of claim 1, wherein each unassigned multi-session host server is a virtual machine that is configured to provide one or more remote desktop services (RDS) to one or more user devices associated with a tenant of the cloud service provider.

3. The method of claim 1, wherein the plurality of unassigned multi-session host servers are hosted in a cloud service.

4. The method of claim 1, comprising:
based on receiving, by the broker server, a logon request from a second user device associated with the first tenant:
determining, by the broker server associated with the cloud service provider, a free capacity of the first server;
determining, by the broker server associated with the cloud service provider, whether the free capacity of the first server is less than a predetermined threshold capacity;
based on determining that the free capacity of the first server is less than the predetermined threshold capacity:

assigning, by the broker server associated with the cloud service provider, a third server with the common image comprising the plurality of services from the catalog of unassigned servers to the first tenant, wherein assigning the third server to the first tenant causes access to the third server to be limited to user devices associated with the first tenant;

removing, by the broker server associated with the cloud service provider, the third server from the catalog of unassigned servers; and brokering, by the broker server associated with the cloud service provider, a third connection between the second user device associated with the first tenant and the third server.

5. The method of claim 1, comprising:
based on receiving a logon request from a second user device associated with the first tenant:
determining, by the broker server associated with the cloud service provider, one or more servers assigned to the first tenant;
determining, by the broker server associated with the cloud service provider, a free capacity for each server of the one or more servers assigned to the first tenant;
determining, by the broker server associated with the cloud service provider, one assigned server of the one or more servers assigned to the first tenant with a largest free capacity; and
brokering, by the broker server associated with the cloud service provider, a third connection between the second user device associated with the first tenant and the determined assigned server of the one or more servers assigned to the first tenant with the largest free capacity.

6. The method of claim 1, comprising:
based on receiving, by the broker server associated with the cloud service provider, a logoff request from the first user device logged in to the first server:
logging, by the broker server associated with the cloud service provider, the first user device out of the first server; and
determining, by the broker server associated with the cloud service provider, whether there are no user devices logged into the first server;
based on determining that there are no user devices logged into the first server:
reimaging, by the broker server associated with the cloud service provider, the first server with the common image comprising the plurality of services; and
adding, by the broker server associated with the cloud service provider, the first server with the common image to the catalog of unassigned servers; and
brokering, based on receiving a logon request from a third user device associated with the second tenant, the first server with the common image with the third user device.

7. A broker server, comprising:
at least one processor; and
memory storing instructions that, when executed by the at least one processor, cause the broker server of a cloud service provider to:
create a catalog of unassigned servers identifying a plurality of unassigned multi-session host servers assignable to a first and second tenant of the cloud service provider, wherein the plurality of unassigned multi-session host servers are initialized by the broker server using a common image comprising a plurality of services subscribed to by the first tenant and the second tenant, and wherein a number of the plurality of unassigned multi-session host servers identified in the catalog of unassigned servers is less than a sum of a number of a first plurality of requested multi-session host servers received from the first tenant and a number of a second plurality of requested multi-session host servers received from the second tenant;

based on receiving a logon request from a first user device associated with the first tenant:
assign a first server with the common image comprising the plurality of services from the catalog of unassigned servers to the first tenant, wherein assigning the first server to the first tenant causes access to the first server to be limited to user devices associated with the first tenant until the first server is reimaged by the broker server, and wherein assigning the first server to the first tenant comprises randomly selecting the first server from the catalog of unassigned servers;
remove the first server from the catalog of unassigned servers; and
broker a first connection between the first user device associated with the first tenant and the first server;

based on receiving a logon request from a second user device associated with the second tenant, wherein the first tenant and the second tenant are located in two different time zones, and a server capacity need of the first tenant and a server capacity need of the second tenant alternate during a single twenty-four-hour cycle:
assign, based at least in part on the first tenant and the second tenant being located in two different time zones and the server capacity need of the first tenant and a server capacity need of the second tenant alternating during a single twenty-four-hour cycle, a second server with the common image comprising the plurality of services from catalog of unassigned servers to the second tenant, wherein assigning the second server to the second tenant causes access to the second server to be limited to user devices associated with the second tenant until the second server is reimaged by the broker server, and wherein assigning the second server to the second tenant comprises assigning the second server to the second tenant based on a number of provisioned servers being sufficient to cover peak demand of a totality of subscribed tenants independent from a total number of requested servers;
remove the second server from the catalog of unassigned servers; and
broker a second connection between the second user device associated with the second tenant and the second server.

8. The broker server of claim 7, wherein the plurality of unassigned multi-session host servers are hosted in a cloud service.

9. The broker server of claim 7, wherein the instructions, when executed by the at least one processor, cause the broker server to:

based on receiving the logon request from the second user device associated with the first tenant:
determine a free capacity of the first server;
determine whether the free capacity of the first server is less than a predetermined threshold capacity;
upon determining that the free capacity of the first server is less than the predetermined threshold capacity:
assign a third server with the common image comprising the plurality of services from the catalog of unassigned servers to the first tenant, wherein assigning the third server to the first tenant causes access to the third server to be limited to user devices associated with the first tenant until the third server is reimaged by the broker server;
remove the third server from the catalog of unassigned servers; and
broker a third connection between the second user device associated with the first tenant and the third server.

10. The broker server of claim 7, wherein the instructions, when executed by the at least one processor, cause the broker server to:
based on receiving a logon request from a second user device associated with the first tenant:
determine one or more servers assigned to the first tenant;
determine a free capacity for each server of the one or more servers assigned to the first tenant;
determine one assigned server of the one or more servers assigned to the first tenant with a largest free capacity; and
broker a third connection between the second user device associated with the first tenant and the determined assigned server of the one or more servers assigned to the first tenant with the largest free capacity.

11. The broker server of claim 7, wherein the instructions, when executed by the at least one processor, cause the broker server to:
based on receiving a logoff request from the first user device logged in to the first server:
determine whether there are user devices logged into the first server;
based on determining that there are no user devices logged into the first server:
reimage the first server with the common image comprising the plurality of services;
remove the assignment from the first server;
add the first server to the catalog of unassigned servers; and
broker, based on receiving a logon request from a third user device associated with the second tenant, the third user device and the first server with the common image.

12. The broker server of claim 7, wherein the first server is reassignable to the second tenant after being reimaged with the common image by the broker server associated with the cloud service provider, and wherein the second server is reassignable to the first tenant after being reimaged with the common image by the broker server associated with the cloud service provider.

13. One or more non-transitory computer-readable media storing instructions that, when executed by a broker server comprising at least one processor and at least one memory, cause the broker server to:
create a catalog of unassigned servers identifying a plurality of unassigned multi-session host servers assignable to a first tenant and a second tenant of a cloud service provider, wherein a number of the plurality of unassigned multi-session host servers is less than a sum of a number of a first plurality of requested multi-session host servers received from the first tenant and a number of a second plurality of requested multi-session host servers received from the second tenant, and wherein the plurality of unassigned multi-session host servers are initialized by the broker server using a common image comprising a plurality of services subscribed to by the first tenant and the second tenant;

based on receiving a logon request from a first user device associated with the first tenant:
assign a first server with the common image comprising the plurality of services from the catalog of unassigned servers to the first tenant, wherein assigning the first server to the first tenant causes access to the first server to be limited to user devices associated with the first tenant until the first server is reimaged by the broker server, and wherein assigning the first server to the first tenant comprises randomly selecting the first server from the catalog of unassigned servers;
remove the first server from the catalog of unassigned servers; and
broker a first connection between the first user device associated with the first tenant and the first server;

based on receiving a logon request from a second user device associated with the second tenant, wherein the first tenant and the second tenant are located in two different time zones, and a server capacity need of the first tenant and a server capacity need of the second tenant alternate during a single twenty-four-hour cycle:
assign, based at least in part on the first tenant and the second tenant being located in two different time zones and the server capacity need of the first tenant and a server capacity need of the second tenant alternating during a single twenty-four hour cycle, a second server with the common image comprising the plurality of services from the catalog of unassigned servers to the second tenant, wherein assigning the second server to the second tenant causes access to the second server to be limited to user devices associated with the second tenant until the second server is reimaged by the broker server, and wherein assigning the second server to the second tenant comprises assigning the second server to the second tenant based on a number of provisioned servers being sufficient to cover peak demand of a totality of subscribed tenants independent from a total number of requested servers;
remove the second server from the catalog of unassigned servers; and
broker a second connection between the second user device associated with the second tenant and the second server.

14. The one or more non-transitory computer-readable media of claim 13, wherein the plurality of unassigned multi-session host servers are hosted in a cloud service.

15. The method of claim 1, further comprising:
reimaging, based on receiving a logoff request from the first user device of the first tenant, the first server with the common image; and
assigning, based on receiving a logon request from another user device of the second tenant, the first server with the common image to the second tenant.

16. The method of claim 1, wherein each unassigned multi-session host server is a physical machine.

17. The method of claim 1, wherein the services comprise software services provided by the cloud service provider, and wherein the common image comprises the software services.

18. The method of claim 1, wherein the first tenant is an enterprise organization, the second tenant is an enterprise organization different from the first tenant, and user devices associated with both the first and second tenants are brokered with servers with the common image.

19. The method of claim 16, wherein each physical machine is assigned to a specific tenant.

20. The method of claim 19, wherein the broker server is configured to connect only users from a single tenant to one or more host servers hosted by a specific physical machine.

* * * * *